(12) United States Patent
Buser et al.

(10) Patent No.: US 11,235,538 B2
(45) Date of Patent: Feb. 1, 2022

(54) REMOTE DETECTION OF INDUCTION WELD TEMPERATURE

(71) Applicant: The Boeing Company, Chicago, IL (US)

(72) Inventors: Yannick Martijn Buser, Enschede (NL); Ulrich Sachs, Enschede (NL); Pedro Pablo Martin Alonso, Madrid (ES); Francis J. Samalot, Berkeley, MO (US); Alexander Rubin, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/986,739

(22) Filed: Aug. 6, 2020

(65) Prior Publication Data

US 2021/0039335 A1    Feb. 11, 2021

(51) Int. Cl.
| | | |
|---|---|---|
| *B29C 65/00* | (2006.01) | |
| *B64F 5/10* | (2017.01) | |
| *B23K 13/01* | (2006.01) | |
| *B23K 13/08* | (2006.01) | |
| *B29C 65/32* | (2006.01) | |
| *B29C 70/06* | (2006.01) | |
| *G01K 11/32* | (2021.01) | |
| *B25J 11/00* | (2006.01) | |

(52) U.S. Cl.
CPC ........ *B29C 66/91651* (2013.01); *B23K 13/01* (2013.01); *B23K 13/08* (2013.01); *B29C 65/32* (2013.01); *B29C 66/721* (2013.01); *B29C 66/91311* (2013.01); *B29C 70/06* (2013.01); *B64F 5/10* (2017.01); *G01K 11/32* (2013.01); *B25J 11/005* (2013.01)

(58) Field of Classification Search
CPC ..... B29C 65/32; B29C 65/364; B29C 66/721; B29C 66/7212; B29C 66/72141; B29C 66/836; B29C 66/87441; B29C 66/91221; B29C 66/91311; B29C 66/91315; B29C 66/91651; B29C 66/91655; B29C 66/9192; B29C 70/06; B23K 13/01; B23K 13/08; G01K 11/32
See application file for complete search history.

(56) References Cited

U.S. PATENT DOCUMENTS

| | | |
|---|---|---|
| 5,529,708 A | 6/1996 | Palmgren et al. |
| 5,573,613 A | 11/1996 | Lunden |
| 2010/0206469 A1* | 8/2010 | Van Wijngaarden ....................... B29C 66/8242 156/245 |

(Continued)

OTHER PUBLICATIONS

European Patent Office Extended Search Report, dated Feb. 13, 2020, regarding Application No. 19382695.5, 9 pages.

*Primary Examiner* — George R Koch
(74) *Attorney, Agent, or Firm* — Yee & Associates, P.C.

(57) ABSTRACT

Systems and methods are provided for controlling welding. One embodiment is a method for controlling welding of a composite part. The method includes locating a linear fiber optic sensor along a composite part comprising a matrix of thermoplastic reinforced by fibers, measuring temperatures along the weld line via the linear fiber optic sensor, performing induction welding at the composite part along the weld line, determining a continuum of weld temperatures along the weld line, and controlling the induction welding based on the continuum of weld temperatures.

22 Claims, 13 Drawing Sheets

(56) References Cited

U.S. PATENT DOCUMENTS

| | | | |
|---|---|---|---|
| 2018/0252556 A1* | 9/2018 | Kishida | G01D 5/268 |
| 2019/0091939 A1 | 3/2019 | Kamihara et al. | |
| 2019/0310077 A1* | 10/2019 | Kishida | G01D 5/35374 |
| 2020/0039153 A1* | 2/2020 | Giurgiutiu | B29C 66/349 |

\* cited by examiner

REMOTE DETECTION OF INDUCTION WELD TEMPERATURE

FIELD

The disclosure relates to the field of composite materials, and in particular, to fabrication of composite parts.

BACKGROUND

Composite parts each comprise a matrix of material reinforced by fibers. For example, some composite parts are made from layers of unidirectional carbon fibers that are stacked in different orientations within a thermoplastic matrix. In order to adhere thermoplastic composite parts together, the parts may be induction welded to form an integral composite part. During induction welding, fibers in the composite parts react to an applied magnetic field, resulting in heating at the composite parts. This increases a temperature of a thermoplastic matrix at an interface of the composite parts to a melting temperature. In this state, thermoplastic material from the composite parts merges together, and upon cooling, the thermoplastic matrices of the two composite parts solidify into one.

While induction welding provides a substantial benefit over prior techniques, controlling the temperature at which an induction weld is performed remains a difficult process. This is unfortunate because if an induction weld is not performed within a specific temperature range, the weld may not be in conformance with desired parameters.

Therefore, it would be desirable to have a method and apparatus that take into account at least some of the issues discussed above, as well as other possible issues.

SUMMARY

Embodiments described herein provide systems and methods which utilize remote sensing technologies to infer a temperature at a weld line for induction welding thermoplastic composite parts together. These techniques are non-invasive and do not require the placement of sensors directly within the weld interface, which increases weld strength and reduces expense. Furthermore, because the sensors are not directly placed at the weld interface, the sensors need not be highly temperature resistant or sacrificial in nature. Thus, monitoring the weld temperature with external sensors during the welding process is a substantial improvement to achieve desired physical properties for an induction weld.

One embodiment is a method for controlling welding of a composite part. The method includes locating a linear fiber optic sensor along a composite part comprising a matrix of thermoplastic reinforced by fibers, measuring temperatures along the weld line via the linear fiber optic sensor, performing induction welding at the composite part along the weld line, determining a continuum of weld temperatures along the weld line, and
controlling the induction welding based on the continuum of weld temperatures.

A further embodiment is a non-transitory computer readable medium embodying programmed instructions which, when executed by a processor, are operable for performing a method. The method includes locating a linear fiber optic sensor along a composite part comprising a matrix of thermoplastic reinforced by fibers, measuring temperatures along the weld line via the linear fiber optic sensor, performing induction welding at the composite part along the weld line, determining a continuum of weld temperatures along the weld line, and controlling the induction welding based on the continuum of weld temperatures.

A further embodiment is an apparatus for facilitating welding of a composite part. The apparatus includes an end effector that generates an electromagnetic field which causes a weld line of a composite part to generate heat resulting in induction welding, a linear fiber optic sensor disposed at the composite part along the weld line, and a controller that measures temperatures along the weld line via the linear fiber optic sensor, determines a continuum of weld temperatures along the weld line, and controls the induction welding based on the continuum of weld temperatures.

Other illustrative embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

DESCRIPTION

The figures and the following description provide specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Figure 1:
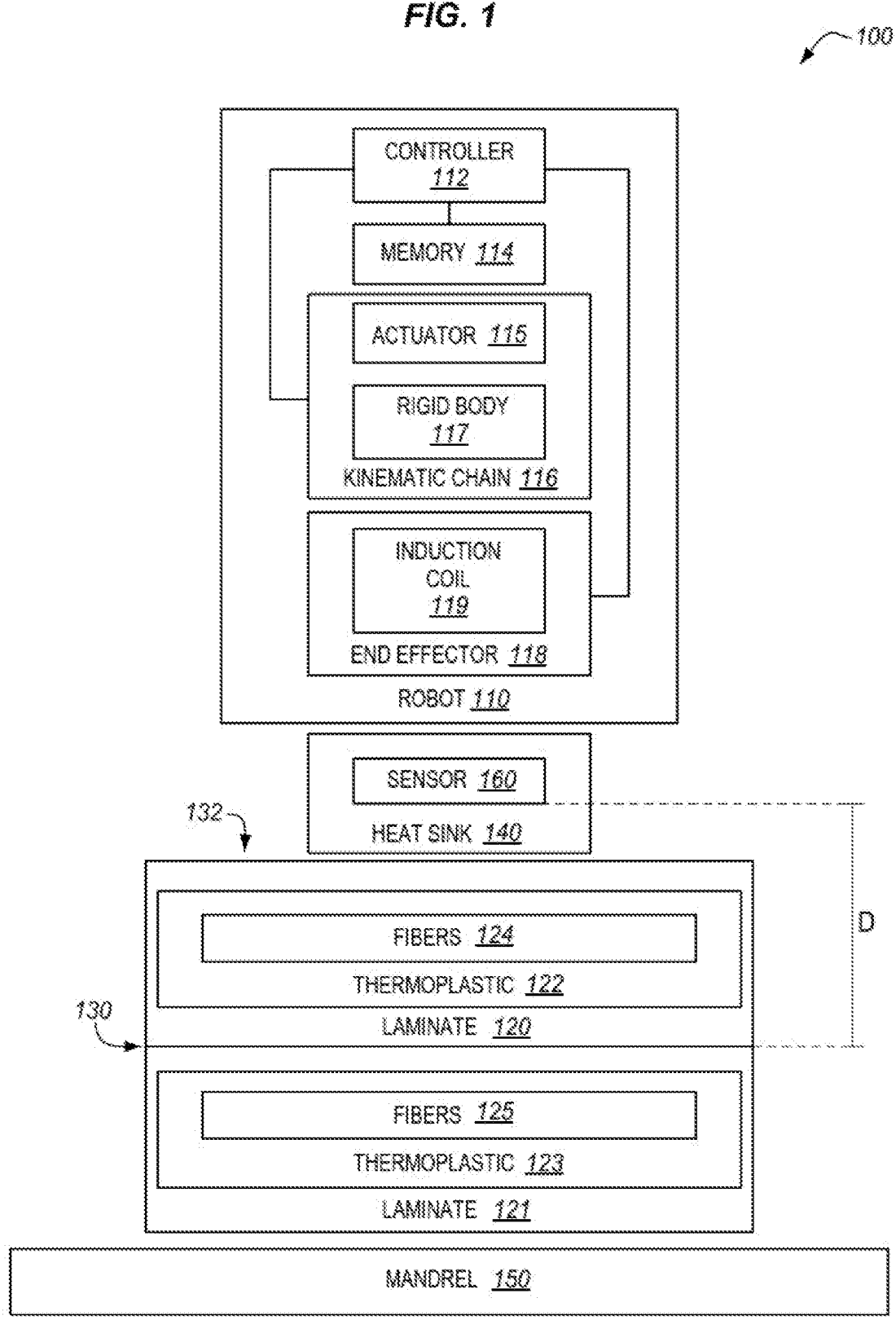
FIG. 1 illustrates an induction welding system in an illustrative embodiment.

FIG. 1 is a block diagram of an induction welding system 100 in an illustrative embodiment. Induction welding system 100 comprises any system, device, or component operable to generate magnetic fields which inductively heat an interface between thermoplastic composite parts in order to form an induction weld. In this embodiment, induction welding system 100 comprises robot 110, which includes a controller 112 and a memory 114 for managing the operations of a kinematic chain 116 comprising actuators 115 and rigid bodies 117. By controlling the motions of kinematic chain 116, the position, speed, and/or direction of an end effector 118 bearing an induction coil 119 may be adjusted. Controller 112 may further control an amount of current applied to induction coil 119, in order to increase or decrease a magnetic field generated by the induction coil 119. This in turn controls a temperature of a weld interface 130 between laminates 120-121 where induction welding is desired. Controller 112 may be implemented, for example, as custom circuitry, as a hardware processor executing programmed instructions, or some combination thereof. Controller 112 may further direct the operations of the various components of robot 110 in accordance with instructions stored in a Numerical Control (NC) program stored in memory 114.

Induction coil 119 generates a magnetic field in response to applied current. The intensity of the magnetic field that is generated is based on the amount of current applied. Thus, induction coil 119 may be controllably adjusted in order to generate magnetic fields of desired strength.

Due to the design of induction coil 119, the magnetic fields generated by induction coil 119 are strongest proximate to weld interface 130 between laminates 120-121. In response to experiencing the magnetic field, fibers 124-125 (e.g., carbon fibers) operate as susceptors and generate heat. This increases a temperature of thermoplastic 122-123 at the laminates 120-121, causing the thermoplastic 122-123 to reach a glass transition temperature. At the glass transition temperature, thermoplastic 122 in the laminate 120 melds or welds with thermoplastic 123 in the other of the laminates 121. This merges the thermoplastic 122-123 in the laminates 120-121 into an integral mass which cools into a single matrix of thermoplastic. Thermoplastic 122-123 may comprise any suitable thermoplastic, such as Polyetheretherketone (PEEK), Polyetherketoneketone (PEKK), etc. Mandrel 150 supports laminates during performance of the induction weld.

Heat sink 140 is separated from the weld interface 130 at which induction welding takes place by one or more of the laminates 120-121. Heat sink 140 absorbs and disperses heat from the surface 132 of the laminate 120. This ensures that heat generated within the laminate 120 at weld interface 130 (e.g., a weld interface of the laminate) does not cause the surface 132 (e.g., a portion of the laminate), to exceed the glass transition temperature (which would result in undesired structural changes to the laminate 120 and/or the laminate 121).

In this embodiment, sensor 160 is embedded within heat sink 140, and measures temperatures (or voltages indicative of magnetic field strength) at a distance D away from the weld interface 130. However, in further embodiments, sensor 160 may be placed at a left or right edge of the heat sink, or at the left or right edge of the weld interface 130, or beneath the laminate 121. Based on a known relationship between temperature at the weld interface 130 and temperature at heat sink 140 (or based on a known relationship between measured magnetic field strength and current applied to induction coil 119), a temperature of the induction weld performed at the weld interface 130 may be determined. Sensor 160 may comprise a thermocouple or an Electromagnetic Field (EMF) sensor (e.g., an EMG sensor having a calibrated loop having at least two hundred loops), such as a sensor designed for operation to acquire measurements at a sampling rate between one and five Megahertz. In further embodiments, sensor 160 comprises an infrared (IR) sensor that measures temperature.

Illustrative details of the operation of induction welding system 100 will be discussed with regard to FIGS. 2-3. Assume, for this embodiment, that multiple thermoplastic laminates have been laid-up and placed against each other for the formation of an induction weld that will make the laminates into a single integral composite part. For example, this may comprise placing a composite part/laminate in contact with another composite part/laminate prior to initiating the induction welding.

Figure 2:
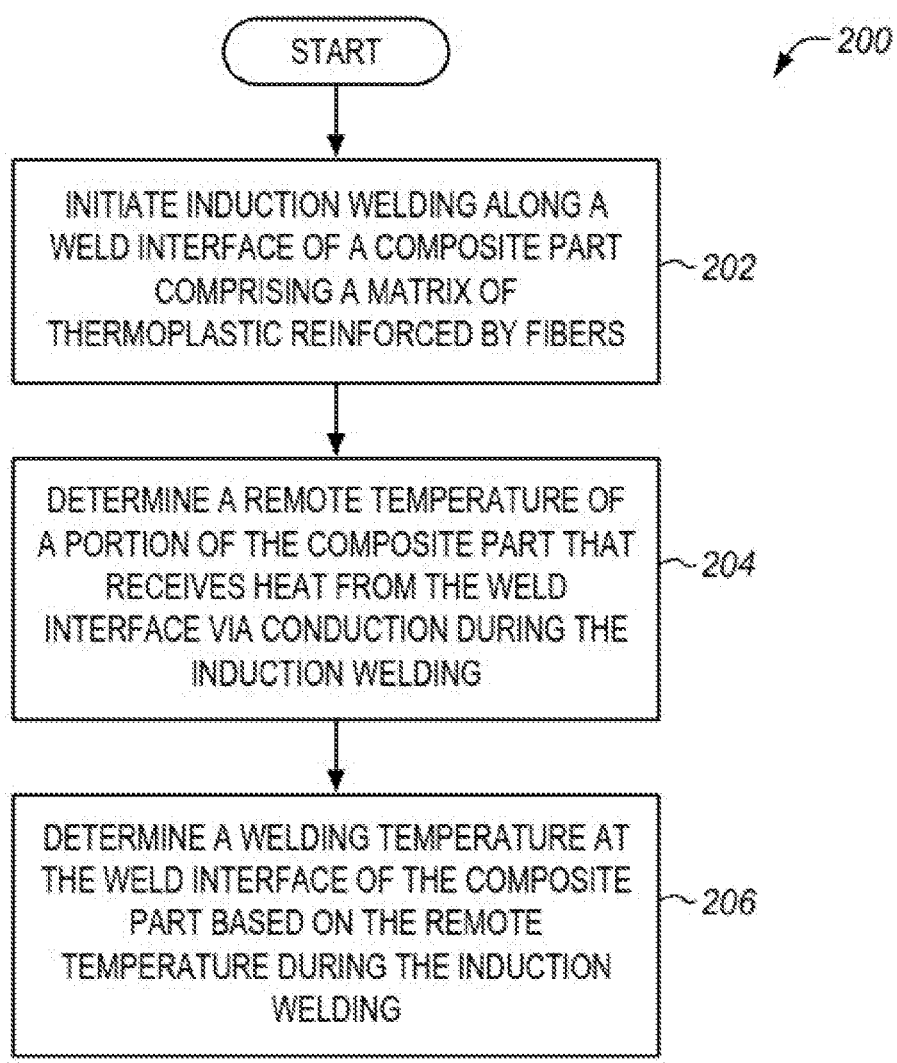
FIG. 2 is a flowchart illustrating a method for operating an induction welding system in an illustrative embodiment.

FIG. 2 is a flowchart illustrating a method 200 for operating an induction welding system based on remotely detected temperatures in an illustrative embodiment. The steps of method 200 are described with reference to induction welding system 100 of FIG. 1, but those skilled in the art will appreciate that method 200 may be performed in other systems. The steps of the flowcharts described herein are not all inclusive and may include other steps not shown. The steps described herein may also be performed in an alternative order.

In step 202, controller 112 initiates induction welding along a weld interface of a composite part (e.g., along weld interface 130 at a laminate 120) comprising a matrix of thermoplastic 122 reinforced by fibers 124. The induction welding is performed along an intersection of the laminate 120. Initiating induction welding may comprise applying a current to induction coil 119 in order to generate a magnetic field, and moving the induction coil 119 along a weld line in order to fuse thermoplastic from two different laminates along a substantial distance (e.g., several to many feet). In further embodiments, the induction coil 119 moves relative to the laminates 120-121, the laminates 120-121 are moved relative to the induction coil 119, or some combination thereof is performed.

Welding the composite part/laminate comprises generating heat within the fibers 124 at the composite part/laminate in response to an applied magnetic field. The width of the weld line may be substantially smaller than the length, and may for example be an inch or less, while the weld line may continue for any feasible distance (e.g., hundreds of feet).

In step 204, controller 112 determines a remote temperature of a portion of the composite part (e.g., surface 132) that receives heat from the weld interface (e.g., weld interface 130) via conduction during the induction welding. That is, controller 112 may consult temperature data from sensor 160, which in this embodiment is disposed at heat sink 140, to determine a temperature of surface 132. Surface 132 has been conductively heated by the fibers 124-125 within the laminates 120-121, which are inductively heated. This heating is controlled by heat sink 140 to draw off the heat rising from the fibers 124-125 below and above the weld interface 130. The temperature readings may be acquired constantly, periodically (e.g., every millisecond, every ten milliseconds, etc.), or at certain processing checkpoints (e.g., a certain amount of time after end effector 118 moves to a new location).

In step 206, controller 112 determines a welding temperature at the weld interface of the composite part (e.g., the weld interface 130) based on the remote temperature during the induction welding. In some embodiments, this determination is made based on known correlations determined from experimental results. For example, controller 112 may consult a model (e.g., a linear model or other model) to derive, based on previously experimentally proven results, a temperature at weld interface 130 based on input from sensor 160. In one embodiment, inferring the welding temperature is determined based on the remote temperature as well as a distance between the portion (e.g. surface 132) and the weld interface (e.g., weld interface 130).

Controller 112 may further store this temperature information, correlated with information indication a location of end effector 118 along a weld line, for later reporting to a technician. The report may comprise a graphical or textual series of statements indicating whether or not the temperature at weld interface 130 was within a desired range.

In further embodiments, controller 112 may control an amount of current applied to induction coil 119 in real-time based on the determined welding temperature. This enables the controller 112 to control the induction welding by adjusting a strength of the magnetic field. For example, if the welding temperature is below a desired operating range for more than a threshold period of time (e.g., several milliseconds), controller 112 may increase the amount of current applied to the induction coil 119. Alternatively, if the welding temperature is above a desired operating range for more than a threshold period of time (e.g., several milliseconds), controller 112 may decrease the amount of current applied to the induction coil 119. In a further embodiment, controller 112 adjusts a speed at which end effector 118 moves along the welding line, based on the inferred welding temperature. In this manner, controller 112 may control the induction welding based on the welding temperature. Controller 112 may further control the rate of the induction welding along the welding line.

Method 200 provides a substantial advantage over prior techniques because it enables the temperature of an induction weld to be accurately determined via remote sensing devices. Thus, no sensing devices are needed at the weld interface, which reduces the complexity and cost of setting up and performing an induction weld. This also eliminates the need to add an element at the weld interface 130 for measuring weld temperature. Such an element would make it more difficult to produce a weld within desired tolerances, and would add weight to the structure. Furthermore, because method 200 enables accurate inference of induction welding temperatures along an entire weld line, a technician performing the method 200 is capable of quickly and efficiently identifying locations along the weld line where further inspection may be desired.

Figure 3:
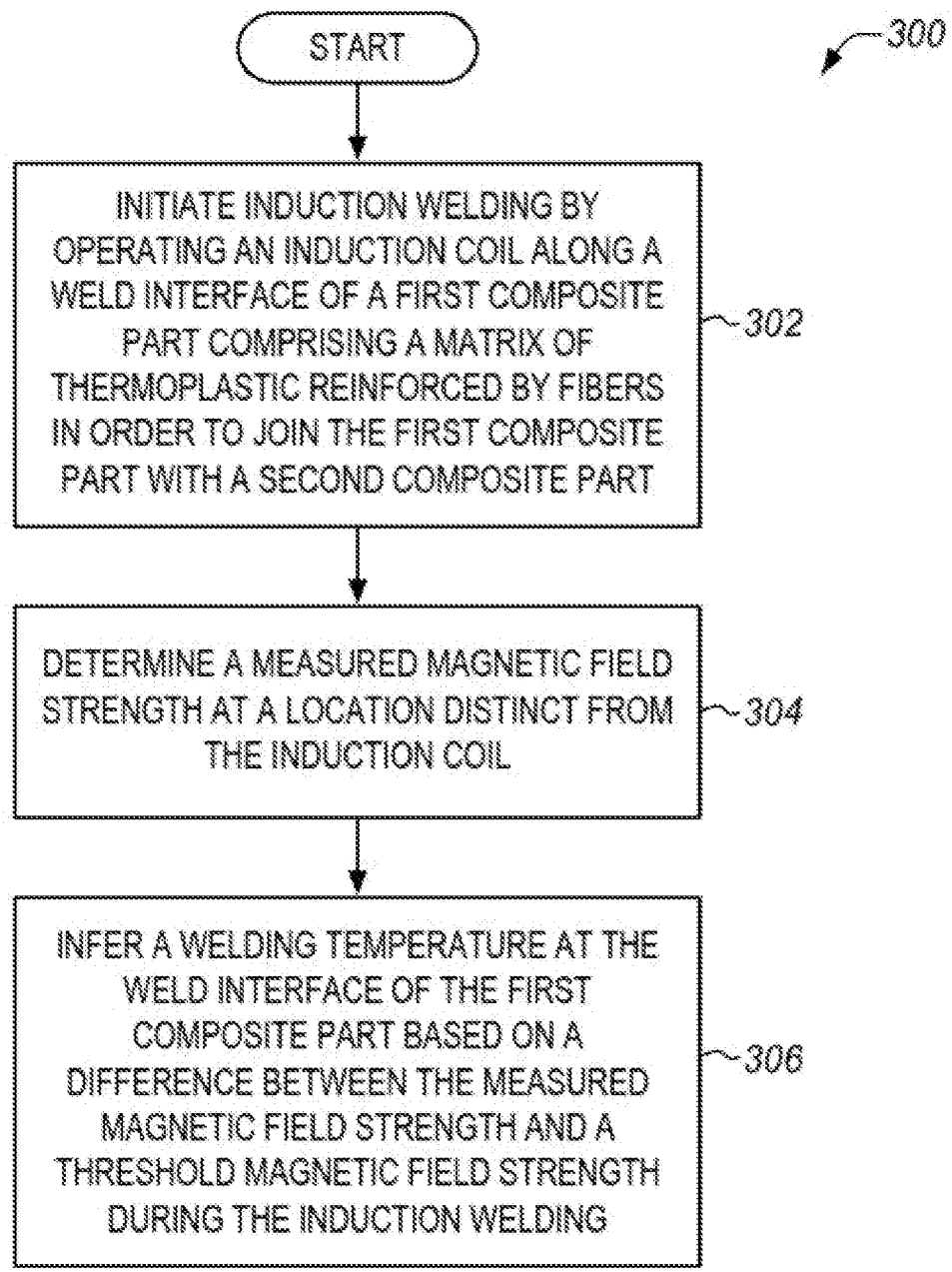
FIG. 3 is a flowchart illustrating a further method for operating an induction welding system in an illustrative embodiment.

FIG. 3 is a flowchart illustrating a method 300 for operating an induction welding system based on remotely detected voltages indicative of magnetic field strength in an illustrative embodiment. The steps of method 300 are described with reference to induction welding system 100 of FIG. 1, but those skilled in the art will appreciate that method 300 may be performed in other systems.

In step 302, controller 112 initiates induction welding along a weld interface of a first composite part (e.g., along weld interface 130 at a laminate 120) comprising a matrix of thermoplastic 122 reinforced by fibers 124, by operating the induction coil 119. This is performed in order to join the first composite part with a second composite part (e.g., laminate 121). Initiating induction welding may comprise applying a current to induction coil 119 in order to generate a magnetic field, and moving the induction coil 119 along a weld line in order to fuse thermoplastic from two different laminates along a substantial distance (e.g., having a length several to many feet). The width of the weld line may be substantially smaller than the length, and may for example be an inch or less.

In step 304, controller 112 determines a measured magnetic field strength at a location distinct from the induction coil 119. (e.g., at sensor 160 within heat sink 140). In one embodiment, this step consists of controller 112 measuring a Root Mean Squared (RMS) voltage at sensor 160, and determining measured magnetic field strength based on a known relationship between measured RMS voltage and field strength. These readings may be acquired constantly, periodically (e.g., every millisecond, every ten milliseconds, etc.), or at certain processing checkpoints (e.g., a certain amount of time after end effector 118 moves to a new location).

In step 306, controller 112 determines a welding temperature at the weld interface of the first composite part (e.g., the weld interface 130) based on a difference between the measured magnetic field strength and a threshold magnetic field strength during the induction welding. Energy used to generate the magnetic field at induction coil 119 is absorbed by fibers 124 when the fibers 124 are heated by the magnetic field. This reduces a strength of the magnetic field. Thus, the amount that a magnetic field has been reduced from a threshold (such as a baseline or expected amount of strength if no laminates were absorbing energy from the magnetic field at the present amount of current being applied to induction coil 119 indicates an amount of energy that is being used to heat the weld interface 130. This amount of energy may be experimentally measured and correlated with specific temperatures at the weld interface 130.

To infer the welding temperature, controller 112 may consult a model (e.g., a linear model or other model) to derive, based on previously experimentally proven results, a temperature at weld interface 130 based on input from sensor 160. Controller 112 may further store this temperature information, correlated with information indication a location of end effector 118 along a weld line, for later reporting to a technician. The report may comprise a graphical or textual series of statements indicating whether or not the temperature at weld interface 130 was within a desired range.

In one embodiment, inferring the welding temperature is determined based on the measured voltage as well as a distance between the portion (e.g. surface 132) and the weld interface (e.g., weld interface 130). In such an embodiment, determining the welding temperature may comprise calculating, based on the RMS voltage, a current at induction coil 119, and determining the welding temperature based on the current at the induction coil. In further embodiments, other parameters are involved including welding speed, heat sink parameters, a number of plies of fiber in either laminate, a distance of the coil from the weld line, a thickness and type of materials being welded, and etc.

In further embodiments, controller 112 may control an amount of current applied to induction coil 119 in real-time based on the determined welding temperature. For example, if the welding temperature is below a desired operating range for more than a threshold period of time (e.g., several milliseconds), controller 112 may increase the amount of current applied to the induction coil 119. Alternatively, if the welding temperature is above a desired operating range for more than a threshold period of time (e.g., several milliseconds), controller 112 may decrease the amount of current applied to the induction coil 119 to adjust the strength of the magnetic field. In a further embodiment, controller 112 may adjust a speed at which end effector 118 moves along the welding line, based on the inferred welding temperature, and identifies out-of-tolerance locations along the welding line in real-time.

The steps of determining, inferring, and controlling may be performed iteratively in a closed loop during induction welding. In this manner, the controller 112 performs closed loop control of an amount of power applied during the induction welding, based on a current of the induction coil 119 and a speed of travel of the end effector 118 along a weld interface of the laminate 120 (i.e., weld interface 130).

Method 300 provides a substantial advantage over prior techniques because it enables the temperature of an induction weld to be accurately determined via remote sensing devices in real time. Thus, no sensing devices are needed at the weld interface, which reduces the complexity and cost of setting up and performing an induction weld. Furthermore, because method 300 enables accurate inference of induction welding temperatures along an entire weld line (i.e., based upon measured temperatures during the welding pass), a technician performing the method 300 is capable of quickly and efficiently identifying locations along the weld line where further inspection may be desired, and even may identify these locations as they occur.

Figure 4:
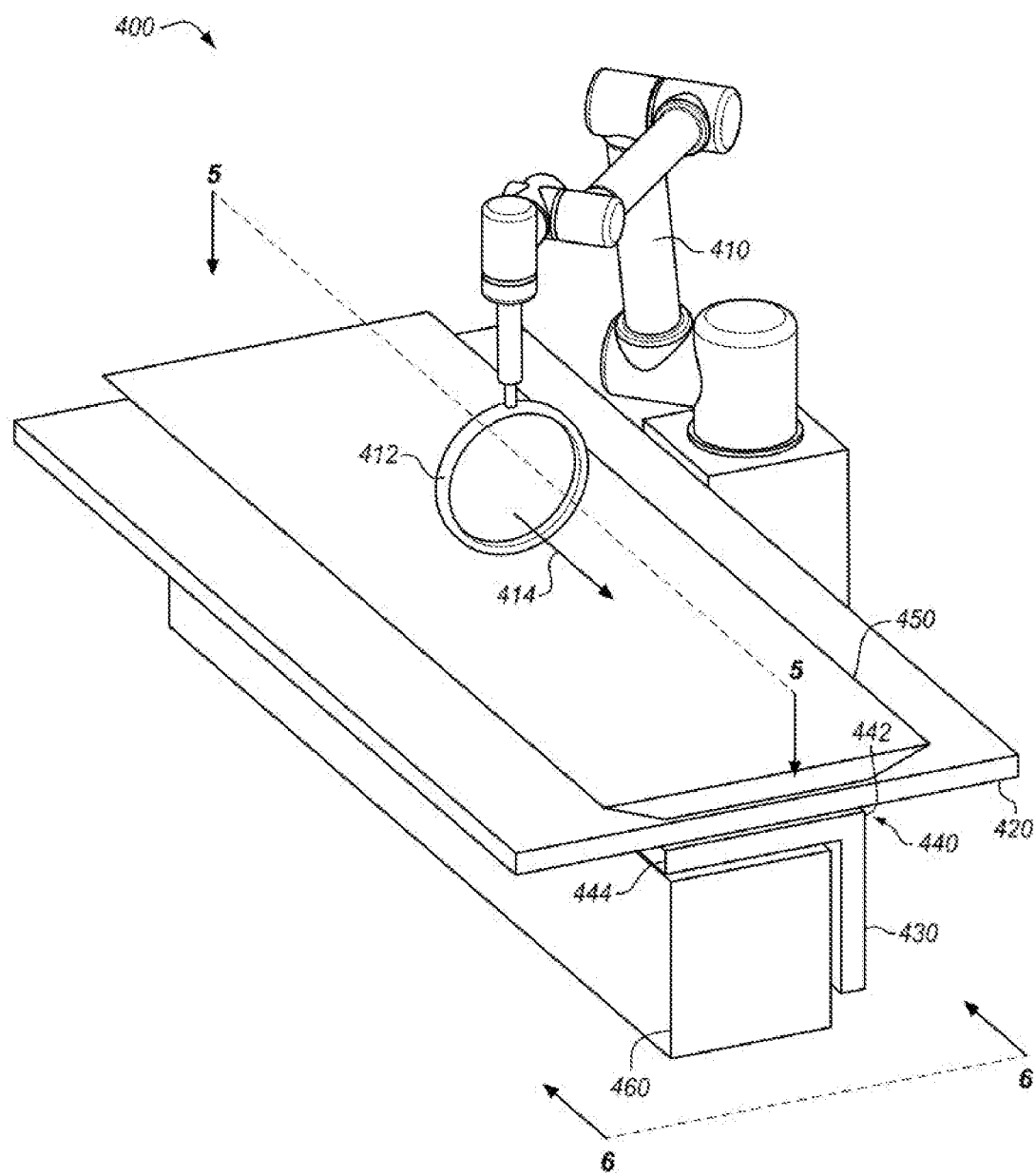
FIG. 4 is a perspective view of an induction welding system operating an induction coil to create an induction weld in an illustrative embodiment.

FIG. 4 is a perspective view of an induction welding system 400 operating an induction coil 412 to create an induction weld in an illustrative embodiment. FIG. 4 is not to scale. In FIG. 4, a robot 410 translates induction coil 412 along weld direction 414 to generate a magnetic field having a greatest field strength along weld interface 440 between laminate 420 and laminate 430. Laminate 430 is laid-up onto mandrel 460, and heat sinks 450 are disposed atop the laminate 420 in order to diffuse heat. Laminate 420 may be implemented as a wide panel, but is shown at its current narrow dimensions for clarity. In further embodiments, the heat sinks 450 extend beyond the welding line to control bonding temperature of the welding line from edge 442 to edge 444.

Figure 5:
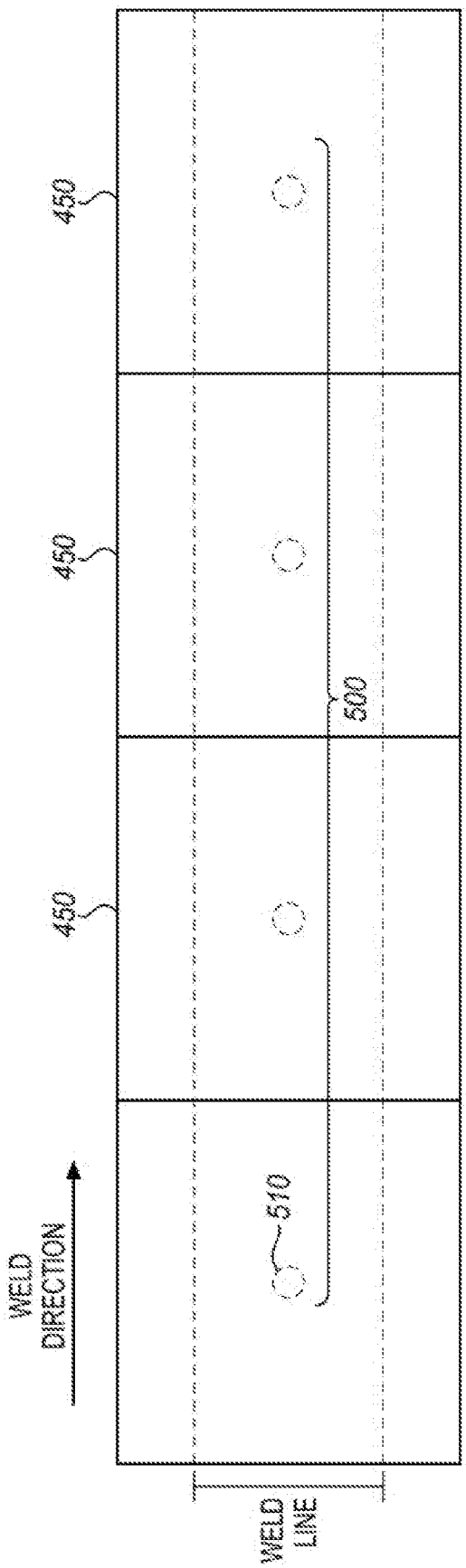
FIG. 5 is a top view of an induction welding system operating an induction coil to create an induction weld in an illustrative embodiment.

FIG. 5 is a top view of the induction welding system of FIG. 4 operating an induction coil to create an induction weld in an illustrative embodiment, and corresponds with view arrows 5 of FIG. 4. In FIG. 5, heat sinks 450 are depicted, as is a weld line (e.g., having a width of about one inch and continuing from left to right). FIG. 5 is not to scale, in order to allow for certain features to be more effectively illustrated. An array 500 of Sensors 510 (e.g., Type E thermocouples, EMF sensors, etc.) embedded within each heat sink 450 are also depicted.

While these sensors do not physically contact the weld interface 440, they are capable of determining remote temperatures (or RMS voltages) from which a temperature at the weld interface may be inferred.

In one embodiment, while moving an end effector, controller 112 identifies a thermocouple in the array that is disposed closest to the end effector or induction coil, and determines the remote temperature by operating that thermocouple. In a further embodiment, controller 112 identifies an EMF sensor in the array that is disposed closest to the end effector or induction coil, and, magnetic field strength via the operations of the EMF sensor (e.g., based on a determined voltage at the EMF sensor).

In a further embodiment, a sensor and an end effector travel at the same speed and in the same direction across the composite part during the induction welding, such that the sensor remains disposed directly below the end effector for the duration of the induction welding process. Stated another way, there is a pairing of the EMF sensor and the induction coil such that even if the induction coil does not move, but rather the weld interface moves, a desired positioning of the coil to the EMF sensor is maintained.

Figure 6:
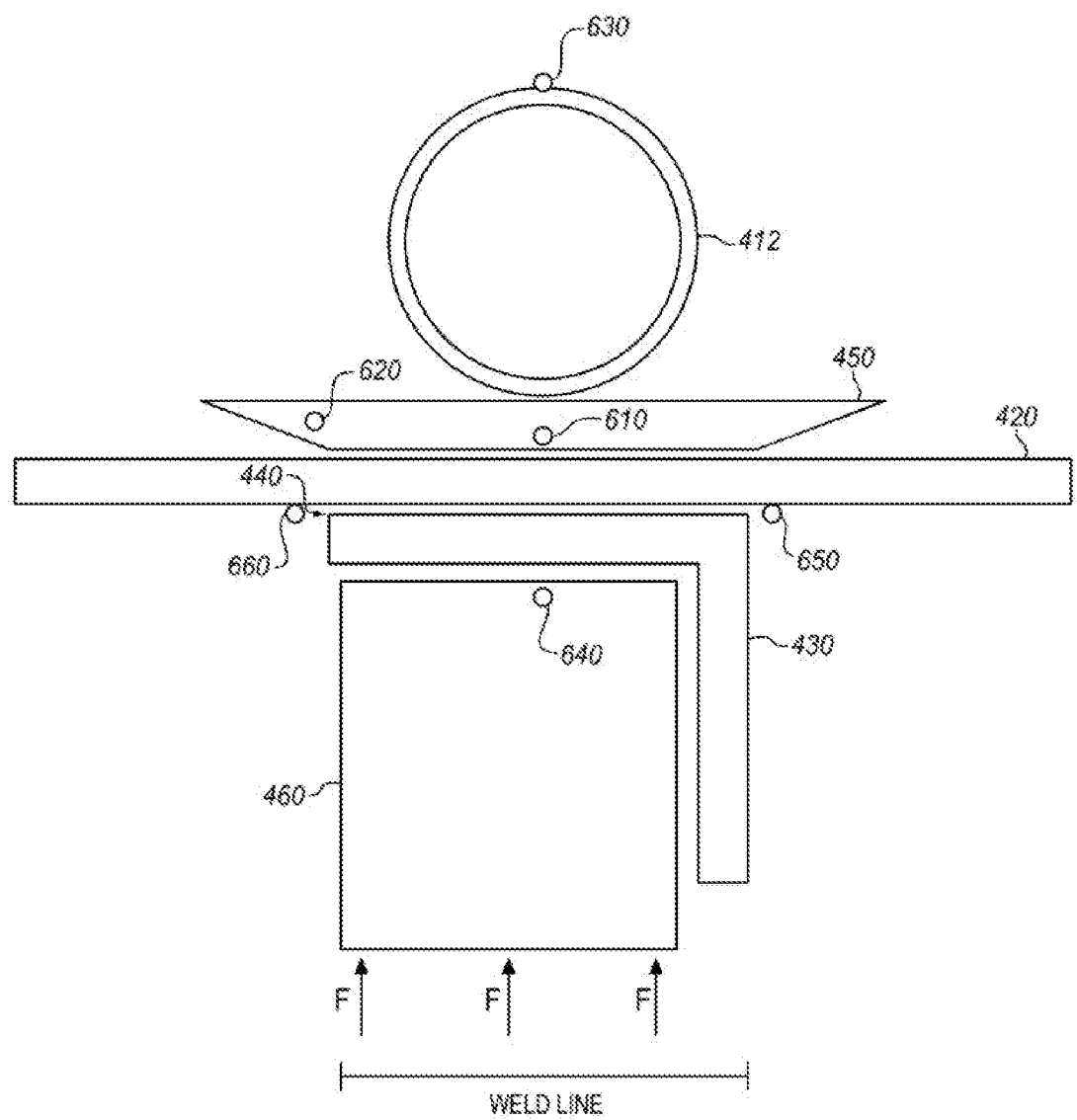
FIG. 6 is an end view of an induction welding system operating an induction coil to create an induction weld in an illustrative embodiment.

FIG. 6 is an end view of the induction welding system of FIG. 4 operating an induction coil to create an induction weld in an illustrative embodiment, and corresponds with view arrows 6 of FIG. 4. As shown in FIG. 6, sensors 610, 620, and 640 may comprise temperature sensors capable of reporting remote temperatures to a controller of a robot operating the induction coil 412. Meanwhile, sensors 610, 620, 630, 640, 650, and 660 may comprise RMS voltage sensors for determining measured magnetic field strengths, or both thermocouple and magnetic field sensors at all locations. In further embodiments, an induction welding system may utilize any or a combination of the sensors depicted in FIG. 6 to infer temperature at the weld interface 440. As shown in FIG. 6, mandrel 460 is pressed against laminate 430 at a force F in order to ensure that laminate 430 and laminate 420 are sufficiently compacted to generate an induction weld of desired strength.

Figure 7:
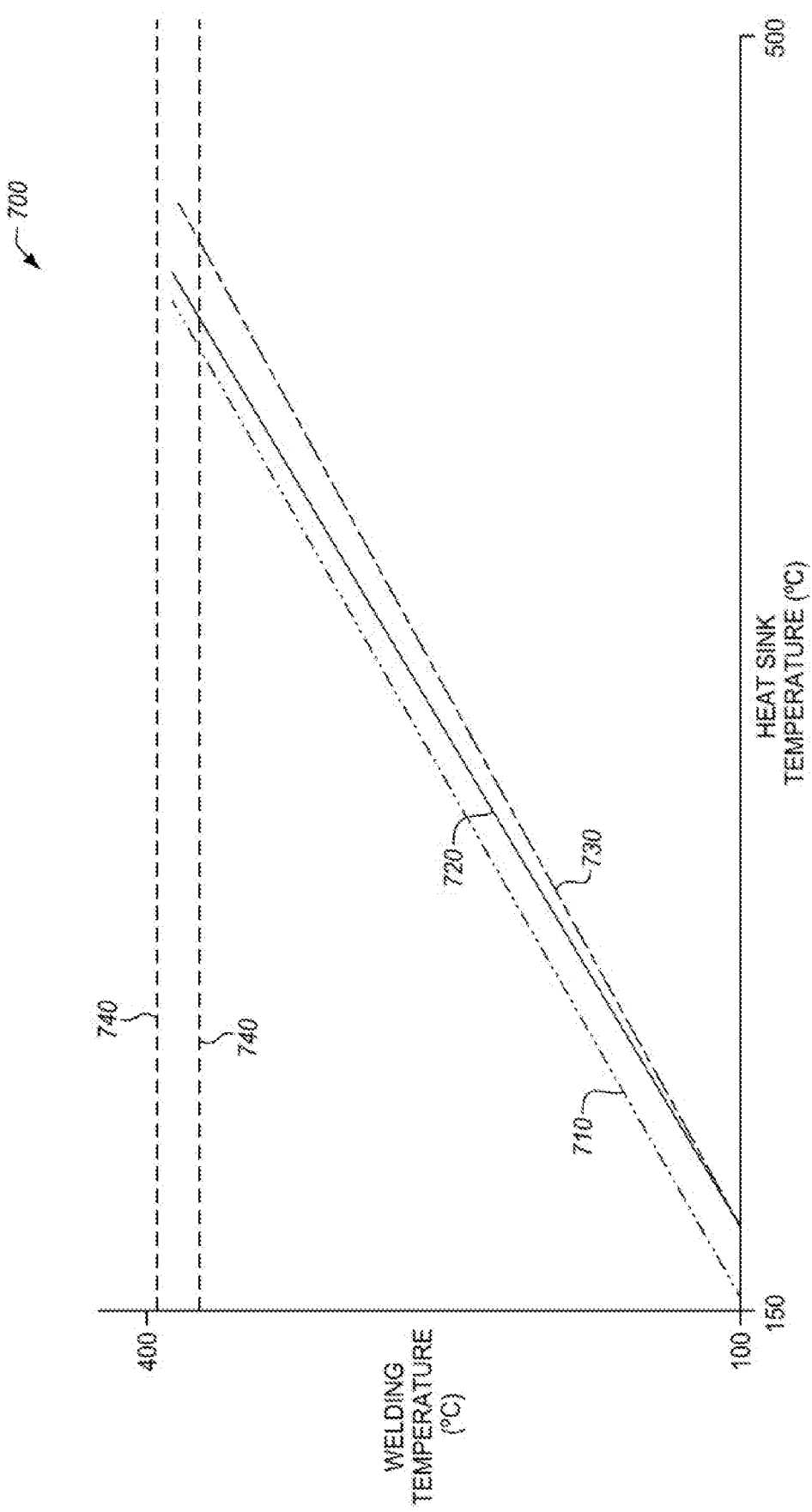
FIG. 7 is a chart illustrating relationships between induction weld temperature and heat sink temperature in an illustrative embodiment.

FIG. 7 is a chart 700 illustrating relationships between induction weld temperature and heat sink temperature in an illustrative embodiment. These relationships may be considered during step 206 of method 200 discussed above. In FIG. 7, relationships between weld temperature and heat sink temperature are depicted for each of multiple different materials (e.g., thermoplastics, or combinations of thermoplastics and fibers). Each relationship is depicted as a best fit line supported by experimental data (e.g., line 710, line 720, line 730). This relationship may be used to determine whether or not an induction weld is being performed within a desired operating range 740.

Figure 8:
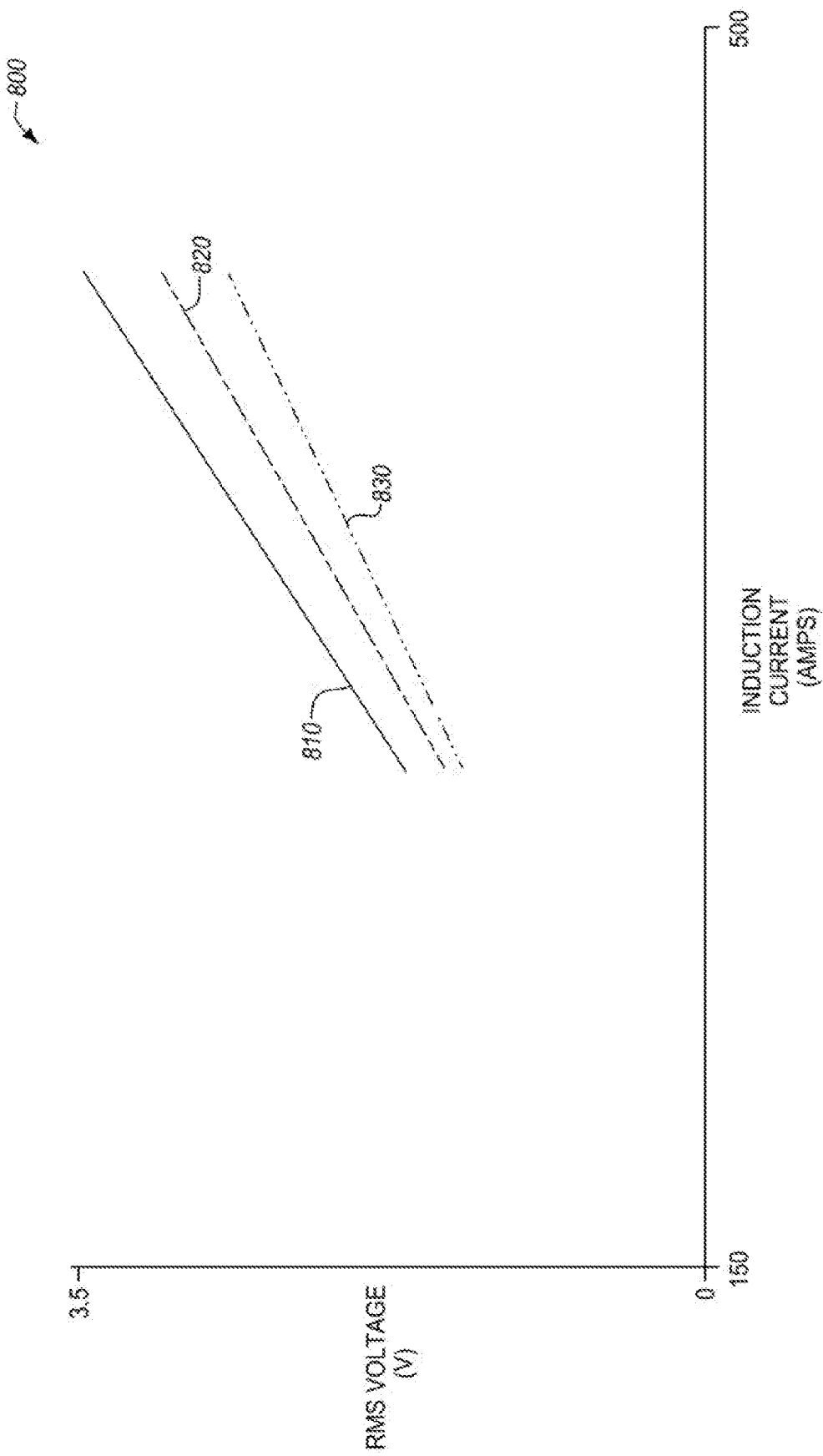
FIG. 8 is a chart illustrating relationships between detected voltage and induction current in an illustrative embodiment.

FIG. 8 is a chart 800 illustrating relationships between detected voltage and induction current in an illustrative embodiment. These relationships may be considered during step 306 of method 300 discussed above. In FIG. 8, relationships between RMS voltages detected (by a sensor) and induction current (applied to an induction coil) are known for multiple different scenarios indicating a different amount of material being heated (e.g., no laminate in line 810, one laminate in line 820, and two laminates in line 830). Each relationship is depicted as a best fit line supported by experimental data. The difference between these known scenarios may be used to determine a difference between expected and measured magnetic fields, which may indicate whether or not an induction weld is being performed in a desired operating range of temperatures.

Figure 9:
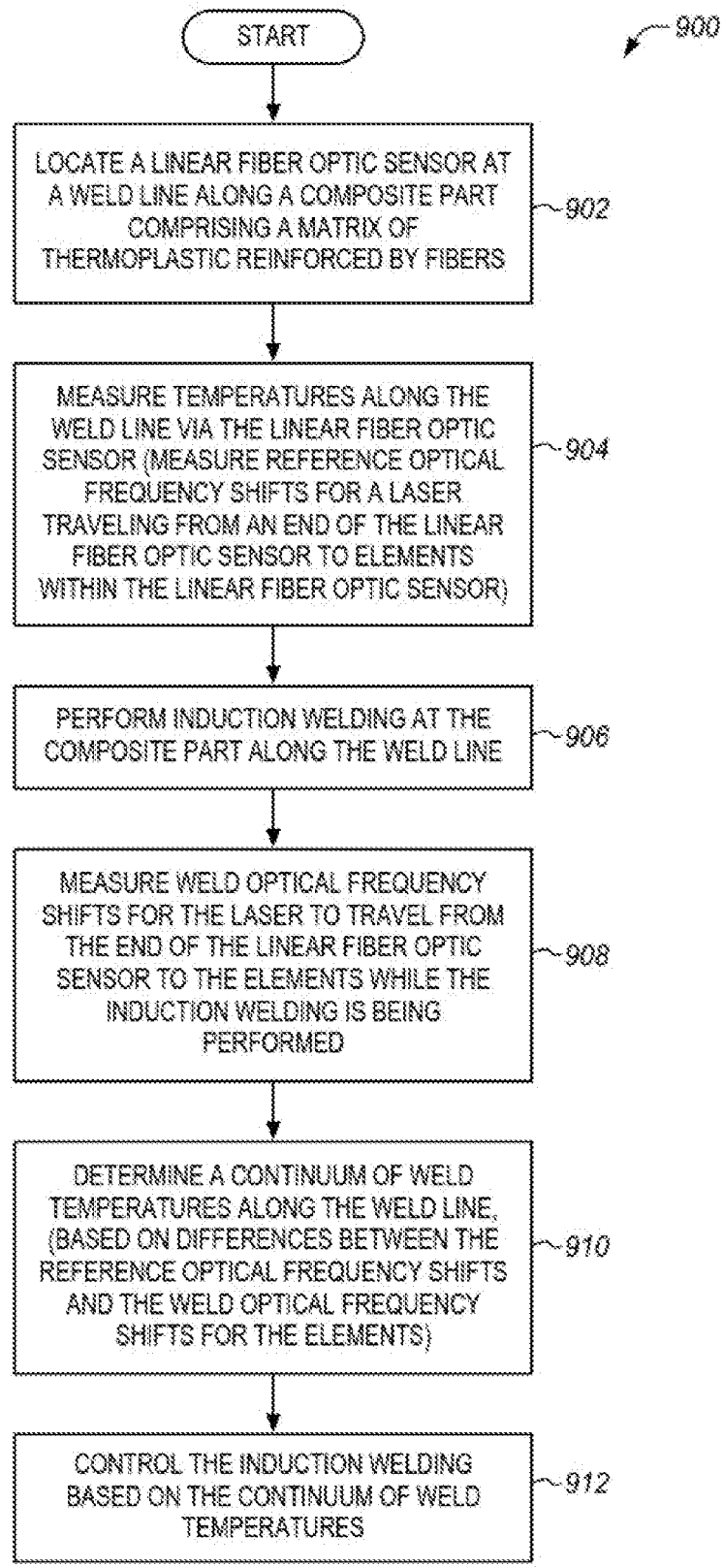
FIG. 9 is a flowchart illustrating a method for monitoring temperature via a linear fiber optic sensor in an illustrative embodiment.

In further embodiments, fiber optic sensors are utilized to track an entire continuum of temperatures along a weld line. FIG. 9 is a flowchart illustrating a method 900 for monitoring temperature via a linear fiber optic sensor 1100 (FIG. 11) in an illustrative embodiment. Method 900 enables an entire continuum of temperatures to be acquired and updated in real-time as an induction weld is performed. Sensing performed by a linear fiber optic sensor 1100 as discussed herein is based on Rayleigh Scattering happening inside of the sensor. This phenomenon may be observed to determine changes in dimensions of the sensor resulting from a change in temperature. Specifically, changes in measured optical frequency may indicate a change in temperature at the sensor.

In step 902, a linear fiber optic sensor 1100 is located at a weld line along a composite part comprising a matrix of thermoplastic reinforced by fibers. The linear fiber optic sensor 1100 comprises an elongated thread that proceeds along an expected weld line. In some embodiments, the weld line follows a contour, and the linear fiber optic sensor 1100 is conformed to the contour. The linear fiber optic sensor 1100 includes sensing elements which change in length in response to changes in temperature, as well as in response to applied forces. The linear fiber optic sensor 1100 may further include a cover that shields the elements of the linear fiber optic sensor 1100 from physical strain while induction welding is performed. In one embodiment, the cover is rigid and does not substantially thermally expand during induction welding, which means that the cover does not generate strain that stretches the elements.

In step 904, temperatures are measured along the weld line via the linear fiber optic sensor 1100. This may comprise measuring reference optical frequency shifts for light from a laser traveling from an end of the linear fiber optic sensor 1100 to elements within the linear fiber optic sensor 1100. During this process, a controller operates the laser to transmit the light along the linear fiber optic sensor 1100. At each element within the linear fiber optic sensor 1100, a portion of the laser is reflected back towards the laser. By measuring the optical frequency shift for the laser as its light reaches and returns from each element, a continuum of baseline, ambient temperature optical frequency shifts is constructed. In further embodiments, these techniques are also used within a fabricated composite part in order to measure change in strain instead of (or together with) changes in temperature. The measurements of strain may be utilized to determine stress/loading of a joint in real time while the composite part is in service.

In step 906, induction welding is performed at the composite part along the weld line (which may be parallel to the linear fiber optic sensor 1100). During induction welding, the composite part is heated, and this heat is transferred via conduction to the linear fiber optic sensor 1100. The heating of the linear fiber optic sensor results in thermal expansion of the elements of the fiber optic sensor, which increases the length of the elements and therefore alters the frequency of light from a laser that traverses the linear fiber optic sensor. These frequency shifts are measurable, and are capable of being correlated with known temperatures.

In step 908, a controller measures weld optical frequency shifts, which are changes in optical frequency for light from the laser as the light travels from the end of the linear fiber optic sensor to the elements while the induction welding is being performed. In step 910, the controller determines a continuum of weld temperatures along the weld line, for example based on differences between the reference optical frequency shifts and the weld optical frequency shifts for the elements. In one embodiment, the controller determines the continuum of weld temperatures along the weld line by: determining sensor temperatures along the linear fiber optic sensor, based on differences between a reference optical frequency shift and a weld optical frequency shift for each of the elements, and determining a weld temperature from each sensor temperature, based on a known relationship between sensor temperatures and welding temperatures. The known relationship can be based on a material that the composite part is made from, a thickness of the composite part, a fiber orientation within the composite part, and a distance of the linear fiber optic sensor to the weld line. In one embodiment, determining the continuum of weld temperatures along the weld line comprises determining a weld temperature at each of multiple locations (e.g., each corresponding with a different element of the linear fiber optic sensor) that are separated by less than one millimeter from each other.

In step 912, the controller controls the induction welding, based on the continuum of weld temperatures. Controlling the induction welding comprises adjusting a speed of an induction coil over the weld line, adjusting an amount of current applied to the induction coil, or performing other operations to manage measured temperatures at one or more locations along the continuum.

In further embodiments, the linear fiber optic sensor is disposed within the composite part, and is utilized in the composite part to transmit optical signals for the purpose of inspection or communication. In further embodiments, the linear fiber optic sensor is disposed within either of the fiber reinforced composites being welded together. The linear fiber optic sensor therefore becomes an integral fiber within the structure being welded together. The linear fiber optic sensor is then used after the weld is completed, in order to monitor the health of the bond joint during operation and maintenance. For example, strain experienced at the bond joint may be monitored via the linear fiber optic sensor.

Figure 10:
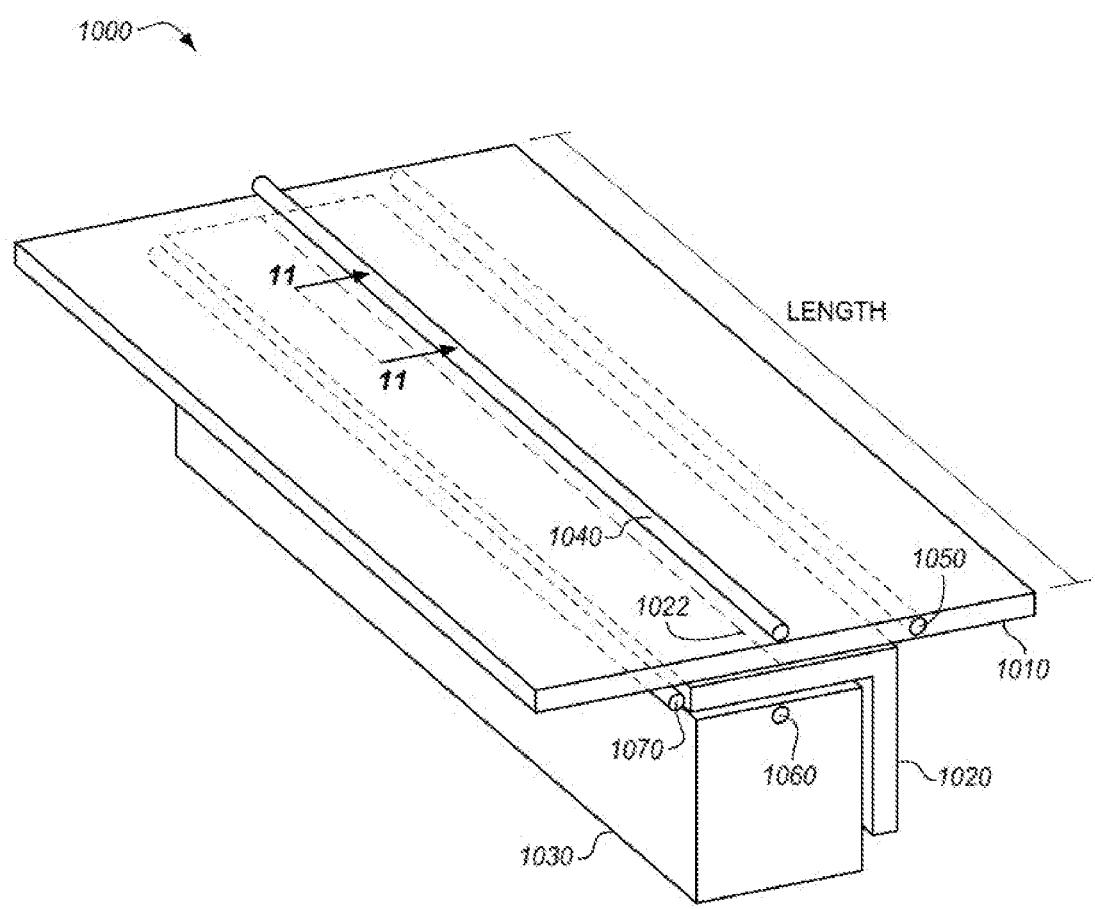
FIG. 10 is a perspective view of linear fiber optic sensors that monitor temperature in an illustrative embodiment.

FIG. 10 is a perspective view of linear fiber optic sensors that monitor temperature in an illustrative embodiment. FIG. 10 illustrates that within environment 1000, a linear fiber optic sensor may be disposed at locations 1040, 1060, and/or 1070 proximate to a weld line 1022 between a composite part 1010 and a composite part 1020 that is shaped onto a mandrel 1030. The linear fiber optic sensor may even be disposed at location 1050 within one of the composite parts, or at other locations. These locations include positions disposed to either side of the weld line 1022, above the weld line 1022, or even below the weld line 1022 within the mandrel 1030, just above the weld line itself, or in any locations that a thermocouple could be disposed as discussed above.

Figure 11:
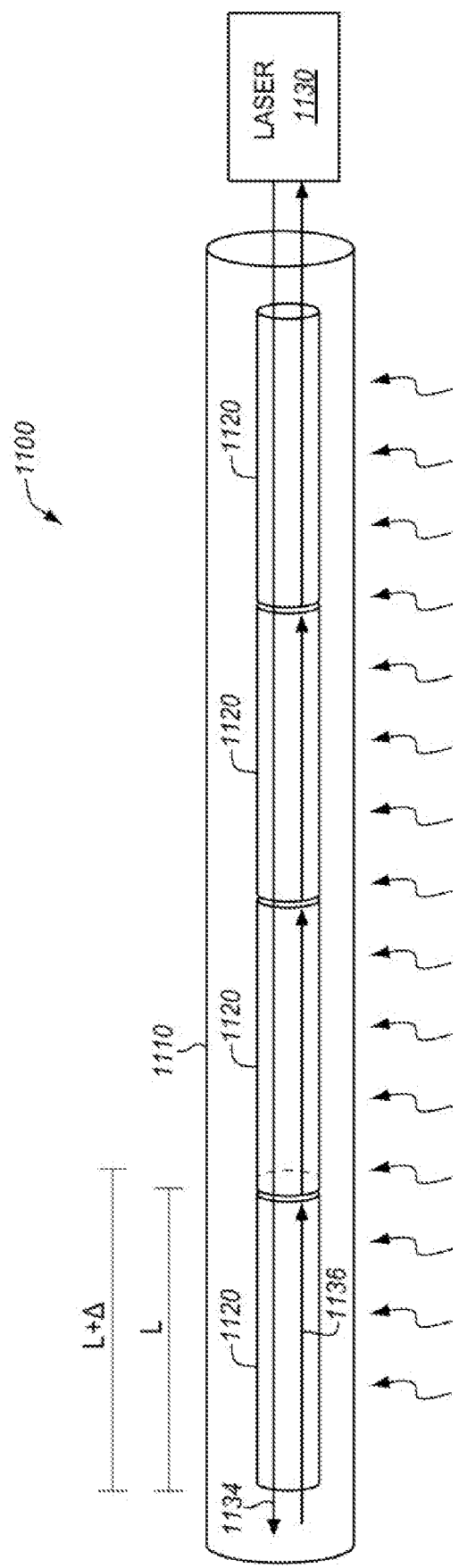
FIG. 11 is a cut-through view of a linear optic fiber sensor in an illustrative embodiment.

FIG. 11 is a cut-through view of a linear optic fiber sensor in an illustrative embodiment, and corresponds with view arrows 11 of FIG. 10. According to FIG. 11, a linear fiber optic sensor 1100 includes a cover 1110 (also referred to as a sheathe) that operates as a physical shield for elements 1120, protecting the elements 1120 from physical strain caused by external forces. The elements 1120 are optically transparent and each extend for less than a millimeter. Each element 1120 reflects a portion of light 1134 generated by a laser 1130. For example, in this embodiment reflected portions 1136 are provided back to the laser 1130, and the timing of these reflected portions indicates a distance traveled. When one of the elements 1120 is heated, its length increases from a baseline length (L) to a greater length (L+Δ). This results in a difference in optical frequency that is detectable. Thus, it is possible to experimentally determine a temperature at each of the elements 1120, based on the change in optical frequency. The temperature at each of the elements 1120 is correlated with a temperature at a weld line, based on a distance of the element 1120 from the weld line and a type of material being heated.

Figure 12:
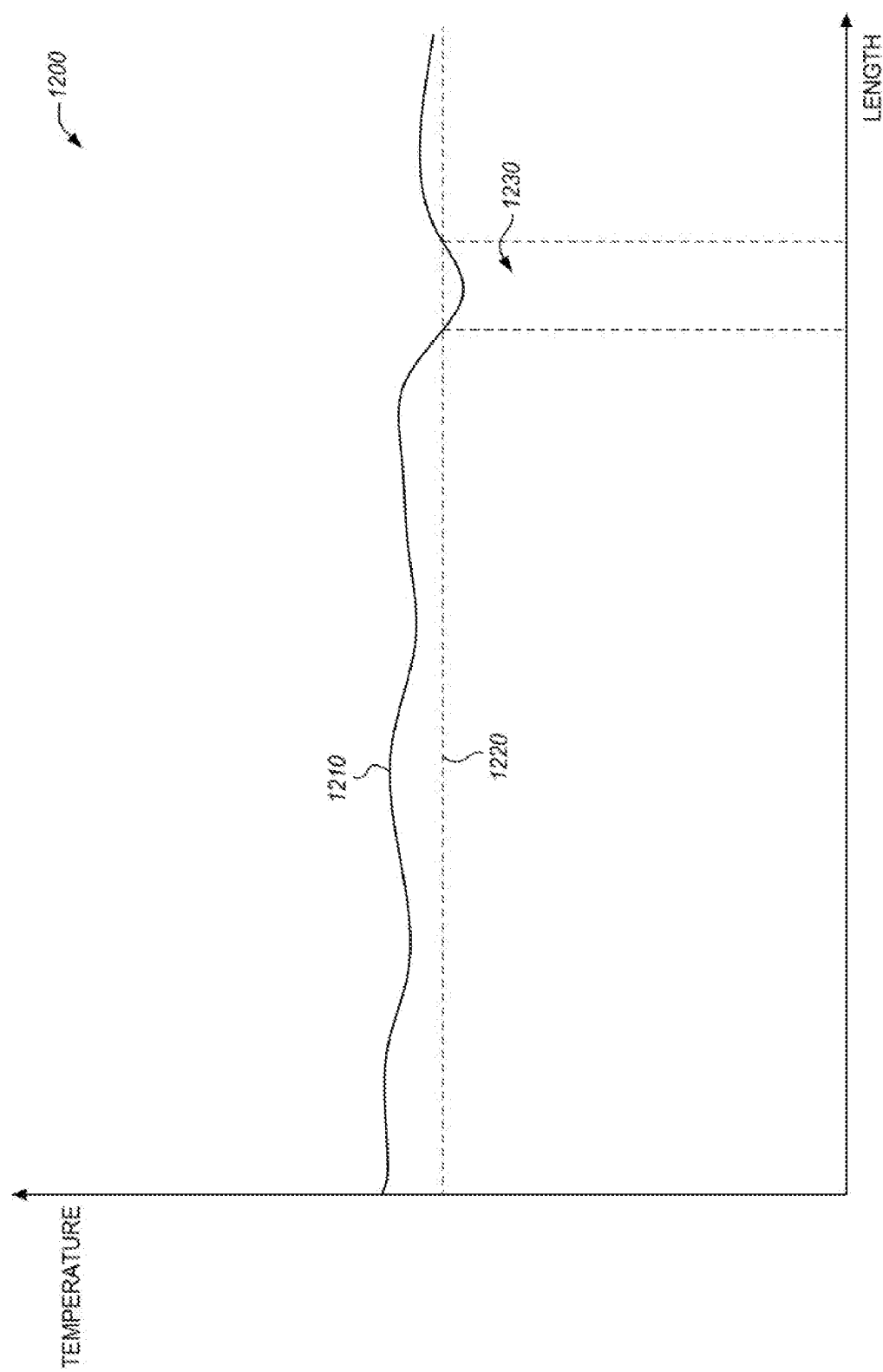
FIG. 12 is a chart depicting a continuum of temperatures measured by a linear fiber optic sensor in an illustrative embodiment.

FIG. 12 is a chart 1200 depicting a continuum 1210 of temperatures measured by a linear fiber optic sensor in an illustrative embodiment. According to FIG. 12, the continuum 1210 is constructed from temperatures determined along a length of the linear fiber optic sensor, and is updated in real-time. Temperature in a region 1230 has dropped below a threshold level 1220. Based on this information, a controller determines that an additional pass of an induction welding coil will be performed at the region 1230. In further embodiments, in addition to or instead of performing an additional pass, coil strength is adjusted or coil speed is adjusted to increase an adjust an amount of heat generated at the weld line.

Examples

In the following examples, additional processes, systems, and methods are described in the context of an induction welding system.

Figure 13:
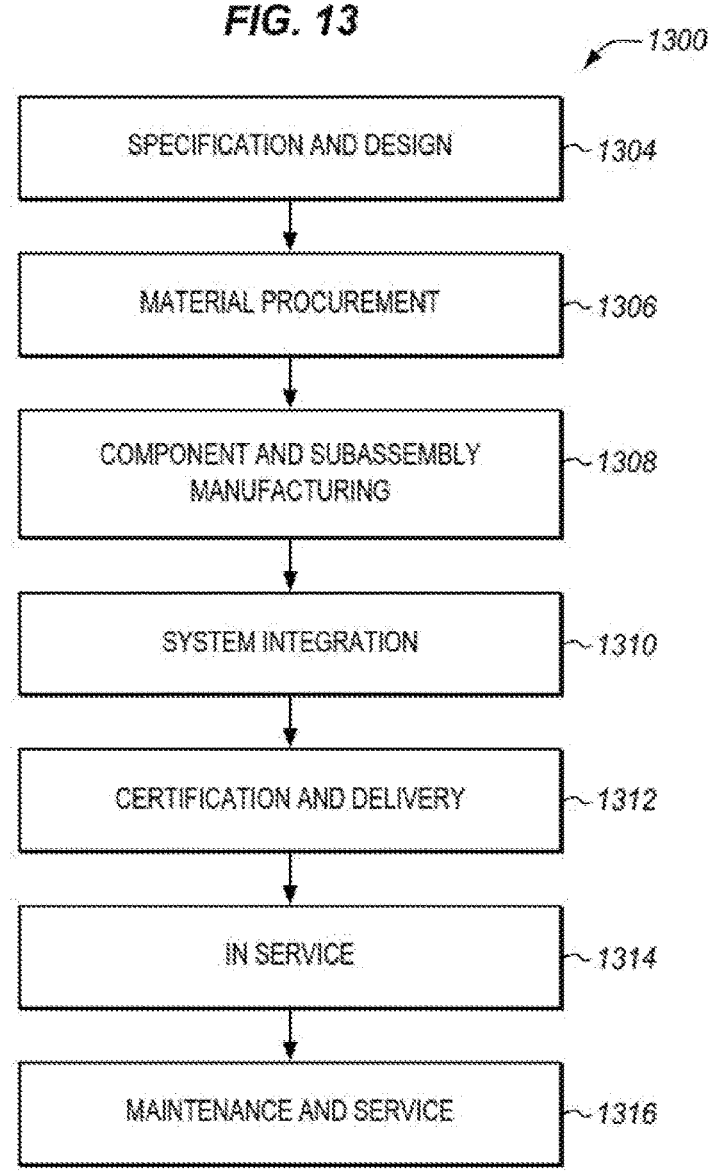
FIG. 13 is a flow diagram of aircraft production and service methodology in an illustrative embodiment.
Figure 14:
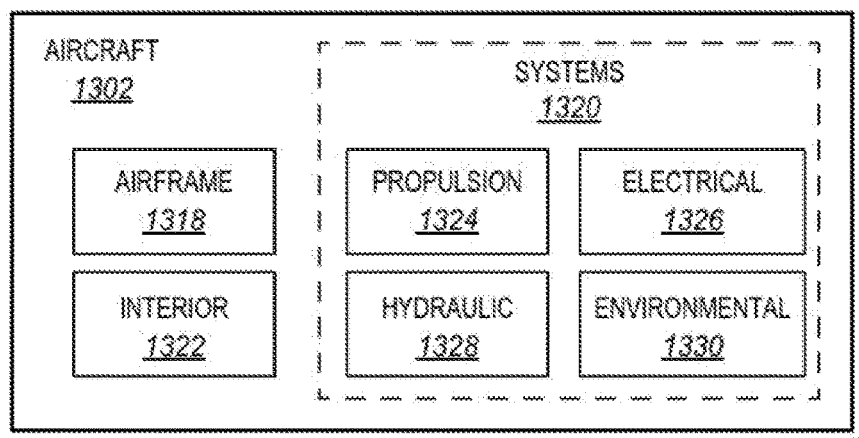
FIG. 14 is a block diagram of an aircraft in an illustrative embodiment.

Referring more particularly to the drawings, embodiments of the disclosure may be described in the context of aircraft manufacturing and service in method 1300 as shown in FIG. 13 and an aircraft 1302 as shown in FIG. 14. During pre-production, method 1300 may include specification and design 1304 of the aircraft 1302 and material procurement 1306. During production, component and subassembly manufacturing 1308 and system integration 1310 of the aircraft 1302 takes place. Thereafter, the aircraft 1302 may go through certification and delivery 1312 in order to be placed in service 1314. While in service by a customer, the aircraft 1302 is scheduled for routine work in maintenance and service 1316 (which may also include modification, reconfiguration, refurbishment, and so on). Apparatus and methods embodied herein may be employed during any one or more suitable stages of the production and service described in method 1300 (e.g., specification and design 1304, material procurement 1306, component and subassembly manufacturing 1308, system integration 1310, certification and delivery 1312, service 1314, maintenance and service 1316) and/or any suitable component of aircraft 1302 (e.g., airframe 1318, systems 1320, interior 1322, propulsion system 1324, electrical system 1326, hydraulic system 1328, environmental 1330).

Each of the processes of method 1300 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 14, the aircraft 1302 produced by method 1300 may include an airframe 1318 with a plurality of systems 1320 and an interior 1322. Examples of systems 1320 include one or more of a propulsion system 1324, an electrical system 1326, a hydraulic system 1328, and an environmental system 1330. Any number of other systems may be included. Although an aerospace example is shown, the principles of the invention may be applied to other industries, such as the automotive industry.

As already mentioned above, apparatus and methods embodied herein may be employed during any one or more of the stages of the production and service described in method 1300. For example, components or subassemblies corresponding to component and subassembly manufacturing 1308 may be fabricated or manufactured in a manner similar to components or subassemblies produced while the aircraft 1302 is in service. Also, one or more apparatus embodiments, method embodiments, or a combination thereof may be utilized during the subassembly manufacturing 1308 and system integration 1310, for example, by substantially expediting assembly of or reducing the cost of an aircraft 1302. Similarly, one or more of apparatus embodiments, method embodiments, or a combination thereof may be utilized while the aircraft 1302 is in service, for example and without limitation during the maintenance and service 1316. For example, the techniques and systems described herein may be used for material procurement 1306, component and subassembly manufacturing 1308, system integration 1310, service 1314, and/or maintenance and service 1316, and/or may be used for airframe 1318 and/or interior 1322. These techniques and systems may even be utilized for systems 1320, including, for example, propulsion system 1324, electrical system 1326, hydraulic 1328, and/or environmental system 1330.

In one embodiment, a part comprises a portion of airframe 1318, and is manufactured during component and subassembly manufacturing 1308. The part may then be assembled into an aircraft in system integration 1310, and then be utilized in service 1314 until wear renders the part unusable. Then, in maintenance and service 1316, the part may be discarded and replaced with a newly manufactured part. Inventive components and methods may be utilized throughout component and subassembly manufacturing 1308 in order to manufacture new parts.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

For reasons of completeness, various aspects of the invention are set out in the following numbered clauses:

Clause 1. A method for controlling welding of a composite part, the method comprising:
locating a linear fiber optic sensor along a composite part comprising a matrix of thermoplastic reinforced by fibers;
measuring temperatures along the weld line via the linear fiber optic sensor;

performing induction welding at the composite part along the weld line;
determining a continuum of weld temperatures along the weld line; and
controlling the induction welding based on the continuum of weld temperatures.

Clause 2. The method of clause 1 wherein:
measuring the temperatures comprises measuring reference optical frequency shifts for a laser travelling from an end of the linear fiber optic sensor to elements within the linear fiber optic sensor before the induction welding is performed.

Clause 3. The method of any of clauses 1 or 2 wherein:
the weld line is parallel to the linear fiber optic sensor.

Clause 4. The method of any of clauses 1 to 3 further comprising:
measuring the temperatures comprises measuring weld optical frequency shifts for a laser travelling from an end of the linear fiber optic sensor to elements within the linear fiber optic sensor while the induction welding is being performed.

Clause 5. The method of clause 4 wherein:
measuring temperatures is based on differences between reference optical frequency shifts and weld optical frequency shifts for elements of the linear fiber optic sensor.

Clause 6. The method of any of clauses 1 to 5 wherein:
determining the continuum of weld temperatures along the weld line comprises determining a weld temperature at each of multiple locations that are separated by less than one millimeter from each other.

Clause 7. The method of any of clauses 1 to 6 further comprising:
shielding elements of the linear fiber optic sensor from physical strain while performing the induction welding.

Clause 8. The method of any of clauses 1 to 7 wherein:
the weld line follows a contour, and the method further comprises conforming the linear fiber optic sensor to the contour.

Clause 9. The method of any of clauses 1 to 8 wherein:
determining the continuum of weld temperatures along the weld line comprises:
determining sensor temperatures along the linear fiber optic sensor, based on differences between a reference optical frequency shift and a weld optical frequency shift for each of multiple elements of the linear fiber optic sensor; and
determining a weld temperature from each sensor temperature, based on a known relationship between sensor temperatures and welding temperatures.

Clause 10. The method of clause 9 wherein:
the known relationship is based on a material that the composite part is made from, a thickness, a fiber orientation, and a distance of the linear fiber optic sensor to the weld line.

Clause 11. The method of any of clauses 1 to 10 wherein:
the linear fiber optic sensor is disposed within the composite part.

Clause 12. A portion of an aircraft assembled according to the method of any of clauses 1 to 11.

Clause 13. A non-transitory computer readable medium embodying programmed instructions which, when executed by a processor, are operable for performing a method for controlling welding of a composite part, the method comprising:
locating a linear fiber optic sensor along a composite part comprising a matrix of thermoplastic reinforced by fibers;
measuring temperatures along the weld line via the linear fiber optic sensor;
performing induction welding at the composite part along the weld line;
determining a continuum of weld temperatures along the weld line; and
controlling the induction welding based on the continuum of weld temperatures.

Clause 14. The medium of clause 13 wherein:
measuring the temperatures comprises measuring reference optical frequency shifts for a laser travelling from an end of the linear fiber optic sensor to elements within the linear fiber optic sensor before the induction welding is performed.

Clause 15. The medium of clause 13 or 14 wherein:
the weld line is parallel to the linear fiber optic sensor.

Clause 16. The medium of any of clauses 13 to 15 wherein the method further comprises:
measuring the temperatures comprises measuring weld optical frequency shifts for a laser travelling from an end of the linear fiber optic sensor to elements within the linear fiber optic sensor while the induction welding is being performed.

Clause 17. The medium of clause 16 wherein:
measuring temperatures is based on differences between reference optical frequency shifts and the weld optical frequency shifts for the elements.

Clause 18. The medium of any of clauses 13 to 17 wherein:
determining the continuum of weld temperatures along the weld line comprises determining a weld temperature at each of multiple locations that are separated by less than one millimeter from each other.

Clause 19. The medium of any of clauses 13 to 18 wherein the method further comprises:
shielding the elements of the linear fiber optic sensor from physical strain while performing the induction welding.

Clause 20. The medium of any of clauses 13 to 19 wherein:
the weld line follows a contour, and the method further comprises conforming the linear fiber optic sensor to the contour.

Clause 21. The medium of any of clauses 13 to 21 wherein:
determining the continuum of weld temperatures along the weld line comprises:
determining sensor temperatures along the linear fiber optic sensor, based on differences between a reference optical frequency shift and a weld optical frequency shift for each of multiple elements of the linear fiber optic sensor; and
determining a weld temperature from each sensor temperature, based on a known relationship between sensor temperatures and welding temperatures.

Clause 22. The medium of clause 21 wherein:
the known relationship is based on a material that the composite part is made from, a thickness, a fiber orientation, and a distance of the linear fiber optic sensor to the weld line.

Clause 23. The medium of any of clauses 13 to 22 wherein:
the linear fiber optic sensor is disposed within the composite part.

Clause 24. A portion of an aircraft assembled according to the method defined by the instructions stored on the computer readable medium of any of clauses 13 to 23.

Clause 25. An apparatus for facilitating welding of a composite part, the apparatus comprising:
an end effector that generates an electromagnetic field which causes a weld line of a composite part to generate heat resulting in induction welding;

a linear fiber optic sensor disposed at the composite part along the weld line; and a controller that measures temperatures along the weld line via the linear fiber optic sensor, determines a continuum of weld temperatures along the weld line, and controls the induction welding based on the continuum of weld temperatures.

Clause 26. The apparatus of clause 25 wherein:

the controller measures temperatures by measuring reference optical frequency shifts for a laser to travel from an end of the linear fiber optic sensor to elements within the linear fiber optic sensor prior to induction welding, and measuring weld optical frequency shifts for the laser to travel from the end of the linear fiber optic sensor to the elements while the induction welding is being performed.

Clause 27. The apparatus of clause 26 wherein:

the continuum of temperatures is based on differences between reference optical frequency shifts and weld optical frequency shifts for elements in the linear fiber optic sensor.

Clause 28. The apparatus of any of clauses 25 to 27 wherein:

the controller determines the continuum of weld temperatures along the weld line by determining a weld temperature at each of multiple locations that are separated by less than one millimeter from each other.

Clause 29. The apparatus of any of clauses 25 to 28 further comprising:

a cover that surrounds and shields elements of the linear fiber optic sensor from physical strain during the induction welding.

Clause 30. The apparatus of any of clauses 25 to 29 wherein:

the weld line follows a contour, and the linear fiber optic sensor conforms to the contour.

Clause 31. The apparatus of any of clauses 25 to 30 wherein:

the controller determines the continuum of weld temperatures along the weld line by: determining sensor temperatures along the linear fiber optic sensor, based on differences between a reference optical frequency shift and a weld optical frequency shift for each of multiple elements of the linear fiber optic sensor, and determining a weld temperature from each sensor temperature, based on a known relationship between sensor temperatures and welding temperatures.

Clause 32. The apparatus of any of clauses 25 to 31 wherein:

the linear fiber optic sensor is disposed within the composite part.

Clause 33. Fabricating a portion of an aircraft using the apparatus of any of clauses 25 to 32.

Clause 34. A method for controlling welding of a composite part, the method comprising:

locating a linear fiber optic sensor along a composite part comprising a matrix of thermoplastic reinforced by fibers;

measuring reference optical frequency shifts for a laser travelling from an end of the linear fiber optic sensor to elements within the linear fiber optic sensor before induction welding;

performing induction welding at the composite part along the weld line;

measuring reference optical frequency shifts for a laser travelling from an end of the linear fiber optic sensor to elements within the linear fiber optic sensor during induction welding; and controlling the induction welding based on the measured reference optical frequency shifts before and during induction welding.

Clause 35. The method of clause 34 wherein:

determining a continuum of weld temperatures during induction welding based on the measured reference optical frequency shifts before and during induction welding.

Clause 36. The method of any of clause 34 wherein:

induction welding along a line parallel to the linear fiber optic sensor.

Clause 37. The method of any of clause 34 further comprising:

shielding elements of the linear fiber optic sensor from physical strain while performing the induction welding.

Clause 38. The method of any of clause 34 wherein:

determining the continuum of weld temperatures along the weld line comprises:

determining sensor temperatures along the linear fiber optic sensor, based on differences between a reference optical frequency shift and a weld optical frequency shift for each of multiple elements of the linear fiber optic sensor; and determining a weld temperature from each sensor temperature, based on a known relationship between sensor temperatures and welding temperatures.

What is claimed is:

1. A method for controlling welding of a composite part, the method comprising:

locating a linear fiber optic sensor along a composite part comprising a matrix of thermoplastic reinforced by fibers;

measuring temperatures along a weld line via the linear fiber optic sensor;

performing induction welding at the composite part along the weld line;

determining a continuum of weld temperatures along the weld line; and controlling the induction welding based on the continuum of weld temperatures, wherein determining the continuum of weld temperatures along the weld line comprises:

determining sensor temperatures along the linear fiber optic sensor based on differences between a reference optical frequency shift and a weld optical frequency shift for each of multiple elements of the linear fiber optic sensor; and determining a weld temperature from each sensor temperature, based on a known relationship between sensor temperatures and welding temperatures, and wherein the known relationship is based on a material that the composite part is made from, a thickness of the composite part, a fiber orientation within the composite part, and a distance of the linear fiber optic sensor to the weld line.

2. The method of claim 1 wherein:

measuring the temperatures comprises measuring reference optical frequency shifts for a laser travelling from an end of the linear fiber optic sensor to elements within the linear fiber optic sensor before the induction welding is performed.

3. The method of claim 1 wherein:

induction welding along a line parallel to the linear fiber optic sensor.

4. The method of any of claim 1 wherein:

measuring temperatures along the weld line via the linear fiber optic sensor comprises measuring weld optical frequency shifts for a laser travelling from an end of the linear fiber optic sensor to elements within the linear fiber optic sensor while the induction welding is being performed.

5. The method of claim 4 wherein:
measuring the temperatures comprises measuring reference optical frequency shifts for a laser travelling from an end of the linear fiber optic sensor to elements within the linear fiber optic sensor before the induction welding is performed and
measuring temperatures is based on differences between reference optical frequency shifts and weld optical frequency shifts for elements of the linear fiber optic sensor.

6. The method of claim 1 wherein:
determining the continuum of weld temperatures along the weld line comprises determining a weld temperature at each of multiple locations that are separated by less than one millimeter from each other.

7. The method of claim 1 further comprising:
shielding elements of the linear fiber optic sensor from physical strain while performing the induction welding.

8. The method of claim 1 wherein:
the linear fiber optic sensor is disposed within the composite part.

9. A portion of an aircraft assembled according to the method of claim 1.

10. The method of claim 1, further comprising inferring a welding temperature at a weld interface based on a difference between a measured magnetic field strength and a threshold magnetic field strength during induction welding.

11. An apparatus for facilitating welding of a composite part, the apparatus comprising:
an end effector that generates an electromagnetic field which causes a weld line of a composite part to generate heat resulting in induction welding;
a linear fiber optic sensor disposed at the composite part along the weld line; and
a controller that measures temperatures along the weld line via the linear fiber optic sensor, determines a continuum of weld temperatures along the weld line, and controls the induction welding based on the continuum of weld temperatures,
wherein determines the continuum of weld temperatures along the weld line comprises:
determines sensor temperatures along the linear fiber optic sensor based on differences between a reference optical frequency shift and a weld optical frequency shift for each of multiple elements of the linear fiber optic sensor, and
determines a weld temperature from each sensor temperature based on a known relationship between sensor temperatures and welding temperatures, and
wherein the known relationship is based on a material that the composite part is made from, a thickness of the composite part, a fiber orientation within the composite part, and a distance of the linear fiber optic sensor to the weld line.

12. The apparatus of claim 11 wherein:
the controller determines the continuum of weld temperatures along the weld line by determining a weld temperature at each of multiple locations that are separated by less than one millimeter from each other.

13. The apparatus of claim 11 further comprising:
a cover that surrounds and shields elements of the linear fiber optic sensor from physical strain during the induction welding.

14. The apparatus of claim 11 wherein:
the weld line follows a contour, and the linear fiber optic sensor conforms to the contour.

15. The apparatus of claim 11 wherein:
the linear fiber optic sensor is disposed within the composite part.

16. The apparatus of claim 11, further comprising a sensor to infer a welding temperature at a weld interface based on a difference between a measured magnetic field strength and a threshold magnetic field strength during induction welding.

17. A method for controlling welding of a composite part, the method comprising:
locating a linear fiber optic sensor along a composite part comprising a matrix of thermoplastic reinforced by fibers;
measuring reference optical frequency shifts for a laser travelling from an end of the linear fiber optic sensor to elements within the linear fiber optic sensor before induction welding;
performing induction welding at the composite part along a weld line;
measuring reference optical frequency shifts for a laser travelling from an end of the linear fiber optic sensor to elements within the linear fiber optic sensor during induction welding;
determining a continuum of weld temperatures along the weld line; and
controlling the induction welding based on the measured reference optical frequency shifts before and during induction welding,
wherein determining the continuum of weld temperatures along the weld line comprises:
determining sensor temperatures along the linear fiber optic sensor, based on differences between a reference optical frequency shift and a weld optical frequency shift for each of multiple elements of the linear fiber optic sensor, and
determining a weld temperature from each sensor temperature, based on a known relationship between sensor temperatures and welding temperatures, and
wherein the known relationship is based on a material that the composite part is made from, a thickness of the composite part, a fiber orientation within the composite part, and a distance of the linear fiber optic sensor to the weld line.

18. The method of claim 17 wherein:
determining a continuum of weld temperatures during induction welding based on the measured reference optical frequency shifts before and during induction welding.

19. The method of claim 17 wherein:
induction welding along a line parallel to the linear fiber optic sensor.

20. The method of claim 17 further comprising:
shielding elements of the linear fiber optic sensor from physical strain while performing the induction welding.

21. The method of claim 17 wherein:
determining the continuum of weld temperatures along the weld line comprises:
determining sensor temperatures along the linear fiber optic sensor, based on differences between a reference optical frequency shift and a weld optical frequency shift for each of multiple elements of the linear fiber optic sensor; and determining a weld temperature from each sensor temperature, based on a known relationship between sensor temperatures and welding temperatures.

22. The method of claim 17, further comprising inferring a welding temperature at a weld interface based on a difference between a measured magnetic field strength and a threshold magnetic field strength during induction welding.

* * * * *